B. E. ELDRED.
CLAD METALS AND PROCESS OF MAKING SAME.
APPLICATION FILED JAN. 21, 1910.
1,043,576.
Patented Nov. 5, 1912.
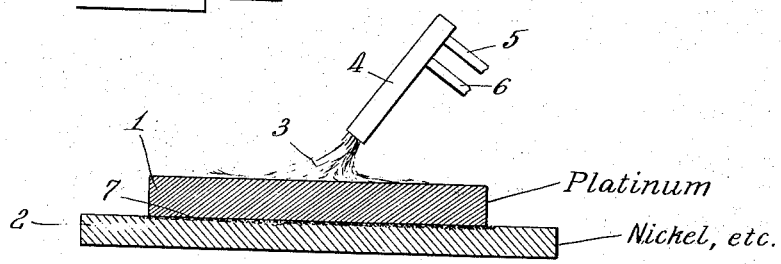
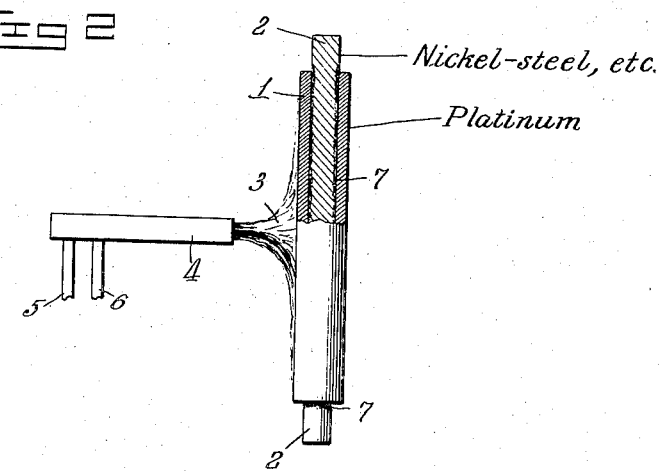
Witnesses
H. G. Robinette
R. F. Steward
Inventor
Byron E. Eldred.
By K. P. McElroy
Attorney

UNITED STATES PATENT OFFICE.

BYRON E. ELDRED, OF BRONXVILLE, NEW YORK.

CLAD METALS AND PROCESS OF MAKING SAME.

1,043,576.  Specification of Letters Patent. Patented Nov. 5, 1912.

Application filed January 21, 1910. Serial No. 539,244.

*To all whom it may concern:*

Be it known that I, BYRON E. ELDRED, a citizen of the United States, residing at Bronxville, in the county of Westchester and State of New York, have invented certain new and useful Improvements in Clad Metals and Processes of Making Same, of which the following is a specification.

This invention relates to clad metals and processes of making same; and it comprises a body of a stiff and strong metal of the iron group, such as nickel, steel, nickel-steel, etc., autogenously and permanently united to a body of platinum through an intervening thin autogenously produced layer of linking metal having the properties of metal set from the liquid state; and it furthermore comprises a process of producing such clad metals by assembling a body of platinum and a body of stiff and strong metal of the iron group with major surfaces in contact, raising the temperature until the surface of the strong metal is brought to a state of fusion or incipient fusion and the two bodies united by a liquid or wetting union and then quickly lowering the temperature whereby the fused metal is set or solidified; all as more fully hereinafter set forth and as claimed.

In the arts it has long been deemed desirable to produce a substitute for platinum for the many purposes for which it is industrially employed, such as, for instance, in making spark points, crucibles, acid stills, evaporating dishes, leading-in wires for incandescent lamps, anchor pins for artificial teeth, etc. The natural supplies of platinum are not large while the demand for the metal in the arts grows yearly, being indeed limited only by the great cost of the metal. Platinum is unique among the metals in its combination of high melting point, low expansion and great resistance to oxidizing and corrosive agencies. And since for many of its uses a surface only of platinum is required, most of these substitutes which have been proposed have involved a suggestion to produce bimetals by uniting a layer of platinum with another metal. None of these proposals however has, so far as I am advised, proved successful in commercial practice. It is not particularly difficult to unite platinum directly with gold or silver, both of which are also noble metals, and, with more difficulty, it can also be united with copper and brass. But its assemblage with any of these metals is not particularly desirable for any purposes save jewelry since they are all lower melting, fusing at a temperature below that of platinum and freely alloying with platinum to form low melting alloys. Such assembled metals can therefore only be used at comparatively low temperatures. The expansion and contraction of these metals is also much above that of platinum so that the bimetals cannot well be used for purposes in which, as in making incandescent lamps, the low expansion of the platinum is one of its valuable features. Nor are these metals stronger than platinum itself so that the bimetals do not correct the platinum in this regard. With the stiff and strong metals of comparatively higher melting point of the iron group, such as iron, steel, alloy steels, nickel and cobalt, it has not proved practicable hitherto to produce direct unions with platinum. These metals are quite unlike platinum in their chemical and physical nature and they do not weld to it while in a solid state, whatever the heat and pressure employed. The use of solders, brazes and other metals containing low melting metals like lead, tin, antimony, etc., has been proposed for forming unions between platinum and the stiff and strong metals, but these propositions obviously are inoperative, firstly because for most of the uses of platinum resistance to high temperature is imperatively required, secondly because all these low melting metals form low-melting alloys with platinum and consequently penetrate and ruin the platinum and finally because no such assemblage of metals is susceptible of being worked. In any union of platinum with stiff and strong metals it is desirable to produce the weld between comparatively large bodies having a minimal surface (in comparison with their volume) to be united and afterward work down to finished shapes such as fine wire, sheet, foil, etc.

In any union of platinum and the other metals which is to be of service in the arts it is imperatively necessary that the joined metals be in absolute metallic union at all points between their abutting surfaces and without crack, crevice, seam, or point or line of non-union therebetween. This type of union it is difficult to produce, but it is necessary. If there be a seam or line of non-union, air or corrosive liquids will penetrate and cause oxidation of the strong metal with a parting of the union. Platinum and the stiff and strong metals of course lie a considerable distance apart in the galvanic scale and when in contact with corrosive liquids or moisture tend to set up an efficient galvanic couple. Furthermore, unless the platinum be united to the stronger metal by a union which is, or is equivalent to, a weld-union it cannot take advantage of the strength of the latter but must be present in a layer of substantial thickness having mechanical strength of its own. For such uses as making the leading-in wires of incandescent lamps which are required to hold vacuum indefinitely of course the absence of any pores or seams between the metals is still more necessary.

In practice a seamless union between two unlike metals can only be produced by some type of union of the nature of a wetting union. Where a liquid wets a solid molecule comes into contact with molecule in a manner impossible in producing contact between solid molecule and solid molecule. For the present purposes it is therefore necessary to use one of the metals to be united in a liquid state, this metal of course being the stiff and strong metal since the stiff and strong metals of the iron group all melt somewhat below the fusing point of platinum. But it is not desirable that the amount of liquid metal brought into contact with the platinum be great since otherwise there is the possibility of undue alloying. And it is of course desirable that both the metals shall be substantially pure and unmixed so far as the main body of each is concerned though a little alloying along the line of joiner is not undesirable since it promotes the strength of the union.

I have discovered that by the use of certain expedients I can produce the desired type of weld union between bodies of platinum and bodies of the stiff and strong metals of the iron group, such as nickel, cobalt, iron, steel, alloy steels, such as nickel steel, etc., producing clad or joined metals in which the union is absolute without crevice, seam, or line or point of non-union; such joined metals being furthermore susceptible of working down by the usual methods, such as rolling, drawing, swaging, etc., to any extent desired without injury to the weld union and indeed with great improvement of the metals and their union. While finished articles may be so joined, it is better to produce the union between the major faces of relatively large bodies, as between a billet or rod of the strong metal and a tightly fitting platinum shell or sheath or between the faces of two or more flat bars of the metals, and afterward to work down to finished articles. In coextending the joined metals, a marked improvement is produced in the platinum layer which being compacted between the working tool and the relatively stiff metal to which it is united while held against lateral yielding by the existence of the basal weld union, assumes throughout its mass a peculiar hard, dense, compact texture like the surface texture of hard drawn wire.

In the practice of the present process I assemble a body of platinum, which may be a tube, bar or plate, in contact with a body of stiff and strong metal and then cautiously raise the temperature until the surface of the latter metal assumes a peculiar look indicating superficial fusion with the production of a film of liquid metal. It is not desirable that the main body of the strong metal be melted or even softened; and with care in heating the surface may be liquefied as described without unduly heating the main body. This film of liquid metal which is, of course, in cohesive union with the solid metal from which it is formed, wets the surface of the platinum and enters into absolute molecular contact therewith. Probably there is some alloying taking place between the liquid and the solid metal with which it contacts, but this, provided it does not go too far, is not injurious and is even desirable. Nickel seems particularly inclined to alloy with the platinum. As is well known, cohesion is exerted only across distances of molecular magnitude and in order to produce a cohesive union molecule must be brought into contact with molecule in the same sense in which molecules are in mutual contact in a solid body of metal. Such a contact is afforded by the liquid film in producing this wetting contact, the liquid molecules undoubtedly not only entering the gross superficial rugosities of the surface of the platinum and filling up the spaces but also entering and filling the far finer spaces and depressions of molecular magnitude. Probably, as stated, there is also more or less molecular interpenetration with attendant alloying along the line of joinder, but with proper care this does not extend far into the body of metal on either side. After the film of liquid metal is produced and is in good wetting union with the surface of the platinum I quickly arrest the heating and produce solidification, thereby preventing melting of the main body of the strong metal.

Any convenient and controllable method of heating may be employed, but since it is desirable to produce a rapid rise in temperature up to the relatively high melting point of the stiff and strong metals of the iron class, it is in general desirable to use other heating means than ordinary fire heat; employing, for example a flame fed with oxygen or enriched air. An oxyhydrogen flame may be used; or electric heating may be resorted to. In using flame heating it is desirable that the flame be run slightly reducing.

The surfaces of the metals to be united should of course be clean and free of oxid and should be maintained so during the operation since obviously metal cannot come into contact with metal if there be spacing and intervening films of dirt, oxid or other foreign matter. Mechanical polishing of both metals is desirable.

The shape of the two bodies of metal may be as desired, but for making coated wire the platinum should be employed as a tube and the other metal as a closely fitting core, the core projecting somewhat beyond the end of the shell in the path of the flame where flame heating is used. Shell and core may be in a vertical position. The heat must of course be directed on the platinum shell not only because it is outside but because it is desirable to bring only the superficial layer of the stiff and strong metal next the platinum to fusion, so that the heating cannot well be against another surface. The heating must be through the platinum. The exposed end of the core as it superficially liquefies will furnish a supply of liquid metal to be taken up capillarily in the space between the two hot bodies of metal. In making flat shapes, for sheet and plates and foil, if it be desired to produce material faced with platinum on but one side a flat plate of platinum may be laid on the upper side of a somewhat larger plate of the other metal; or a flat plate of the other metal laid on a somewhat larger plate of platinum. The relative thickness of the layers of the platinum and of the other metal may of course be as desired. Where relatively large thin plates of either metal are employed it is a useful expedient to make a perforation in the center of the uppermost plate to afford a vent for gases evolved in the solidification of the fluid film between the metals and provide for solidification advancing from the periphery to the center. Where double-faced articles are desired, a layer of the strong metal may be laid between two layers of platinum. But it is preferable to apply the two layers of platinum one after the other. After heating in the manner described and then quickly arresting such heating, the uniting film of liquid quickly sets and solidifies. While it is still liquid, the union between the metals is in the nature of a wetting union and this nature does not change in the solidification. In the welded article the union may still be regarded as in the nature of a fluid or wetting union. After the union is effected, the joined metals may be worked down in any way desired. In making wire it is preferable to work down the compound billet formed by swaging rather than rolling or the like as it is easier to preserve the centering of the core. In making sheets or foil from flat shapes rolling may be employed. The joined metals may be worked hot or cold, this depending upon the particular nature of the core metal. Where the joined metal is to be used for crucibles and the like, it is preferably provided with a core of commercially pure nickel, substantially carbon free, as this metal melts at a very high temperature. While the expansion of nickel is quite different from that of platinum with the integral union here produced expansion does not tend to separate the two metals.

The clad metal may be heated red hot and suddenly quenched without failure of the union. For high temperature purposes, the clad metal should be double faced, carrying a layer of platinum on each side. With single faced material the difference in expansion causes buckling. Platinum clad metal is also desirable for making anchor elements for artificial teeth. In making artificial teeth, a pin of platinum is inset in a tooth shaped mass of ceramic material; generally containing feldspar, kaolin or the like, and the mass baked or fired at a very high temperature. Nickel will withstand this temperature better than most of the steels. But in using the clad metal of the present invention for this purpose where the pins are cut from a compound metal wire, the exposed end of the nickel should be shielded from direct contact with the plastic, as by covering with a little alumina, by arching the platinum over, etc., in order to prevent the evolution of gas by the formation of a voltaic couple between the two metals when the plastic material becomes hot and soft. Pure wrought iron may be used in lieu of nickel for this purpose but is not more desirable. For making leading-in wires for electric lamps an alloy of nickel and iron of regulated composition is desirable for the core metal. In making lamps, a leading-in wire is sealed through the hot and plastic glass to give a hermetic joint and for this wire platinum is always employed as platinum has an expansion and contraction not far different from that of many kinds of glass so that a joint formed at a red heat persists after cooling, and as a platinum surface is furthermore "wetted" by plastic glass in a manner not shared by other metals. But platinum's expansion is rarely exactly the same as that of the glass employed and many useful and strong glasses, which it is desirable to use for lamps, have an expansion very materially different. But as nickel steel alloys can be made of any rate of expansion desired, by providing a shell of platinum with a core of nickel steel of proper composition a compound wire may be produced having as a whole any rate of expansion desired and a rate suited to the particular glass to be used. With compound wire of this type, the lamp maker is free to use any glass he may deem desirable instead of being limited to those glasses with an expansion near that of platinum.

While nickel-steel cannot be successfully used directly for leading-in wires since glass does not seal to its surface with a wetting union, so that it is practically impossible to produce gas tight lamps with it, yet when used in this connection good lamps are readily made since there is a wetting union between the nickel steel and the platinum and, in turn, between the platinum and the glass; the platinum, so to speak, acting as a linking means.

For making articles requiring a high degree of strength any of the ordinary steels may be employed; or the nickel steel alloys may also be used. For spark contact points, plugs, and rivets a desirable type of metal is produced by uniting a bar of nickel and a bar of platinum and rolling out to a sheet. The platinum need be on only one face. From this sheet the contact elements may be punched out. If the punch operates from the nickel side, the top of the platinum will be slightly convexed and the platinum will be flowed downward along the nickel shank for a short distance while if the punching be from the platinum side the platinum will be flat surfaced and the nickel similarly extended over its sides.

In cutting any of the compound metals under the present invention if a cutting tool be employed having rounding cutting edges, the platinum may be arched or flowed over the base metal to an extent dependent upon its thickness.

In the accompanying drawings, I have illustrated diagrammatically procedures within the scope of the present invention.

Figure 1 shows a method of uniting bars or plates of platinum and an iron group metal, and Fig. 2 shows a method of making rods or billets having a core of a stiff and strong metal and a sheath of platinum.

Referring to the drawings, 1 is a body of platinum in contact with a stiff, strong metal 2, such as steel, nickel, nickel-steel, or the like. The frame 3 of an oxyhydrogen blow pipe 4, having gas inlets 5 and 6, is directed against the body of platinum until a thin superficial molten layer 7 is formed on the surface of the steel or nickel next the platinum. This superficial layer of molten metal gives the type of weld union here desired. Subsequent to this welding operation, the finished article comprising the weld-united layers is rolled or swaged to the desired dimensions.

What I claim is:—

1. The process of uniting platinum with stiff and strong metals which comprises assembling contacting bodies of platinum and a stiff and strong metal, the contact being between major surfaces, raising the heat by heating through said platinum until said stiff and strong metal superficially liquefies and forms a wetting union with said platinum and then quickly arresting the heating.

2. The process of uniting platinum and nickel which comprises assembling contacting bodies of platinum and nickel, the contact being between major surfaces, raising the heat by heating through said platinum until the said nickel superficially liquefies and forms a wetting union with said platinum and then quickly arresting the heating.

3. The process of uniting platinum and a stiff and strong metal of the iron group, which comprises assembling contacting bodies of platinum and a metal of the iron group, the contact being between major surfaces, raising the heat by heating through said platinum until said stiff and strong metal superficially liquefies and forms a wetting union with said platinum and then quickly arresting the heating.

4. As a new article of manufacture, a compound metal body comprising a layer of platinum and a stiff and strong metal of the iron group united between major surfaces by an autogenous wetting or weld union through a film-like intervening layer possessing the properties of set fused metal.

5. As a new article of manufacture, a compound metal body comprising a layer of platinum and a layer of metal comprising nickel united between major surfaces by an autogenous wetting or weld union through a film-like intervening layer possessing the properties of set fused metal.

6. As a new article of manufacture, a compound metal body comprising a layer of platinum and a layer of nickel united between major surfaces by an autogenous wetting or weld union through a film-like intervening layer possessing the properties of set fused metal.

In testimony whereof, I affix my signature in the presence of witnesses.

BYRON E. ELDRED.

Witnesses:
JOHN A. RILEY,
A. M. SENIOR.